US012515226B2

(12) United States Patent
Zimmermann et al.

(10) Patent No.: US 12,515,226 B2
(45) Date of Patent: Jan. 6, 2026

(54) SAMPLE HOLDER DEVICE FOR BIOLOGICAL SAMPLES, COMPRISING A SAMPLE HOLDER MADE OF A CARBON-BASED MATERIAL

(71) Applicant: Fraunhofer-Gesellschaft zur Foerderung der angewandten Forschung e. V, Munich (DE)

(72) Inventors: Heiko Zimmermann, Sulzbach (DE); Julia Neubauer, Wuerzburg (DE); Ina Meiser, Sulzbach (DE); Michael Gepp, Sulzbach (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 607 days.

(21) Appl. No.: 17/413,526

(22) PCT Filed: Dec. 10, 2019

(86) PCT No.: PCT/EP2019/084529
§ 371 (c)(1),
(2) Date: Jun. 11, 2021

(87) PCT Pub. No.: WO2020/120517
PCT Pub. Date: Jun. 18, 2020

(65) Prior Publication Data

US 2022/0023860 A1 Jan. 27, 2022

(30) Foreign Application Priority Data

Dec. 13, 2018 (DE) ......................... 102018132120.1

(51) Int. Cl.
*B01L 3/00* (2006.01)

(52) U.S. Cl.
CPC ....... *B01L 3/50825* (2013.01); *B01L 3/50853* (2013.01); *B01L 2300/043* (2013.01);
(Continued)

(58) Field of Classification Search
CPC ...... B01L 3/508; B01L 3/5085; B01L 3/5021; B01L 2300/0851; B01L 2300/0858; B01L 2300/12; B01L 2300/16
See application file for complete search history.

(56) References Cited

U.S. PATENT DOCUMENTS 4,789,628 A * 12/1988 Nayak ................ G01N 33/5304 435/805
6,635,471 B1 10/2003 Lee et al.
(Continued)

FOREIGN PATENT DOCUMENTS

CA 2323719 A1 4/2001
DE 19950452 A1 4/2001
(Continued)

OTHER PUBLICATIONS

English Abstract for DE 10214250 A1 (2003).
(Continued)

*Primary Examiner* — Jill A Warden
*Assistant Examiner* — Dwayne K Handy
(74) *Attorney, Agent, or Firm* — Caesar Rivise, PC

(57) ABSTRACT

A sample holder device 100, 101 which is designed to hold biological samples 1 includes a base body 10 having at least one wall 11 which is arranged to delimit a sample receptacle 12, wherein the at least one wall 11 includes, at least on a surface facing the sample receptacle 12, a planar, carbon-based material which is impermeable to a liquid in sample receptacle 12, wherein the carbon-based material has such a high carbon content that the carbon-based material is opaque and electrically conductive. The sample holder device
(Continued)

includes, e.g., a dish, in particular petri dish 101, a planar substrate, a multiwell plate, a sample beaker, in particular in the form of a beaker glass, a sample tube, in particular in the form of a test tube or a tube for cryopreservation (cryovial), and/or a hollow fiber. Methods for using the sample holder device are also described.

10 Claims, 3 Drawing Sheets

(52) U.S. Cl.
CPC ... *B01L 2300/0858* (2013.01); *B01L 2300/12* (2013.01); *B01L 2300/168* (2013.01)

(56) References Cited

U.S. PATENT DOCUMENTS

| | | | | |
|---|---|---|---|---|
| 2002/0055187 | A1* | 5/2002 | Treptow | B01L 3/50851 435/287.1 |
| 2003/0148401 | A1* | 8/2003 | Agrawal | B01L 3/5088 435/7.9 |
| 2004/0161744 | A1 | 8/2004 | Moriya et al. | |
| 2005/0092181 | A1 | 5/2005 | Shih et al. | |
| 2005/0214935 | A1 | 9/2005 | Kuwabara et al. | |
| 2010/0148052 | A1* | 6/2010 | Anahara | H01J 49/0418 252/502 |
| 2011/0020929 | A1 | 1/2011 | Schober et al. | |
| 2011/0125050 | A1 | 5/2011 | Bau et al. | |
| 2013/0136672 | A1 | 5/2013 | Blumentritt et al. | |
| 2014/0302562 | A1 | 10/2014 | Burroughs | |
| 2014/0342454 | A1 | 11/2014 | Burbank et al. | |

FOREIGN PATENT DOCUMENTS

| | | | |
|---|---|---|---|
| DE | 10214250 | A1 | 10/2003 |
| DE | 69928797 | T2 | 8/2006 |
| EP | 0542422 | A1 | 5/1993 |
| EP | 1460415 | A1 | 9/2004 |
| EP | 1486767 | A1 | 12/2004 |
| EP | 1548102 | A1 | 6/2005 |
| JP | 2002-357604 | A | 12/2002 |
| JP | 2003-130874 | A | 5/2003 |
| JP | 2005-168494 | A | 6/2005 |
| JP | 2007-529215 | A | 10/2007 |
| JP | 2013-544088 | A | 12/2013 |
| JP | 2014-23461 | A | 2/2014 |
| WO | 2005090547 | A1 | 9/2005 |
| WO | 2009127647 | A2 | 10/2009 |
| WO | 2012063011 | A2 | 5/2012 |

OTHER PUBLICATIONS

Translation of Chinese Search Report of May 7, 2022.
International Search Report for PCT/EP2019/084529 mailed Apr. 15, 2020.
English Abstract for JP 2003-130874 A (2003).
English Abstract for JP 2014-23461 A (2014).
Japanese Office Action dated Jun. 6, 2023 with Translation.

* cited by examiner

SAMPLE HOLDER DEVICE FOR BIOLOGICAL SAMPLES, COMPRISING A SAMPLE HOLDER MADE OF A CARBON-BASED MATERIAL

CROSS-REFERENCE TO RELATED APPLICATIONS

This application is a U.S. National Phase Application of PCT/EP2019/084529, filed Dec. 10, 2019, which claims priority to DE 102018132120.1, filed Dec. 13, 2018, the contents of which applications are incorporated herein by reference in their entireties for all purposes.

BACKGROUND OF THE INVENTION

The invention relates to a sample holder device for biological samples, in particular a sample holder device for cell cultures in a cultivation medium, e.g. to test, cultivate and/or differentiate biological cells. The invention also relates to methods for manufacturing and using the sample holder device. There are applications of the invention in particular in biotechnology, biomedicine and medical engineering, in particular in diagnostics and/or regenerative medicine.

It is generally known that vessels made of plastic or glass are used in the processing of biological cell or tissue samples. These vessels comprise e.g. dishes, beaker glasses, test tubes or multiwell dishes. Typical working steps in the processing of biological cell or tissue samples include the cultivation of cell cultures in petri or multiwell dishes, in the case of which frequent changes of medium are executed, the execution of differentiation steps which are checked at regular intervals by means of various methods (e.g. expression of cell-specific markers by fluorescence microscopy, electrophysiological derivations), or the transport and/or the storage of biological material, wherein the relevant temperature ranges are at 37° C., room temperature, cooled at +4° C. or cryogenic between −80° C. and −196° C. (cryopreservation).

The vessels known from practice usually have simple, standardized formats which are adapted to working steps to be carried out manually, semi-automatically or automatically. When cultivating and/or differentiating the biological samples in the course of laboratory work, a visual check of the sample in the vessel, e.g. by direct observation or with a microscope, is often provided, hence transparent vessel materials are typically used. Moreover, the vessels are usually used as single-use items in order to not compromise a sample as result of contamination of the vessel. The previously used vessels are therefore often composed of low-cost plastics, such as e.g. polystyrene or polypropylene, which is also expedient for visual checking as a result of their transparency.

There is an ever increasing demand for high-throughput investigations, e.g. in diagnostics or regenerative medicine, wherein the processing of the biological samples is parallelized and miniaturized. For the purposes of parallelisability and miniaturization, the shapes and sizes of the vessels were adapted. For example, multiwell plates (substrate plates with a plurality of single vessels, e.g. micro- or nanotiter plates), for example, with standardized formats of 6 wells per plate up to 1536 wells per plate, are used for automated high-throughput methods.

Multiwell plates have a high level of performance for relatively simple processes, such as, for example, for toxicity assays in studies for in vitro diagnostics (IVD). In practice, however, limitations arise in the case of more complex processes, e.g. in the case of cell and tissue culture, and in particular in the case of high-throughput applications. There are an increasing number of commercially available assays which do not require visible access to the sample but require specific measurements, such as e.g. fluorescence measurements or electrophysiological tests and should be automatable for high throughput. One example of this is the luminescence-based assay with the trade name "Celltiter-Glo" which detects ATP content in the media. In the case of fluorescence measurements, there is interest in measures for shielding disruptive external light from the surroundings. Moreover, it has hitherto been necessary to transfer the cells for electrophysiological tests (derivations of cell currents and/or potentials), as are used for cardiomyocytes or neurons, into special devices adapted for electrophysiological testing. This requires enzymatic or mechanical dissociation steps which can damage the samples. Finally, transfer into special vessels, such as e.g. cryotubes, is also provided for the storage of functional cells and tissue by means of cryopreservation, which special vessels, as a result of their thermal and mechanical properties, tolerate large temperature changes (normally of +4° C. to −196° C.), are stable over the long term and are chemically resistant in terms of substances used in cryopreservation, such as e.g. saline solution.

It is known to adapt sample receptacles for special tasks. For example, EP 1 486 767 A1 describes a multiwell plate which is provided with carbon lattices in the individual wells. The carbon lattices inserted as additional modules into the wells are provided for infrared-spectroscopic measurement of samples in the multiwell plate. EP 542 422 A1 describes a multiwell plate which is provided with a heating device and is manufactured from a plastic, such as e.g. polystyrene. In order to support the action of the heating device, the heat conductivity of the plastic can be increased by the addition of aluminum oxide, metal or carbon fibers. At the same time, it is required in EP 542 422 A1 for performing optical measurements that the plastic in the wells is optically clear and has a smooth surface. However, as a result of their adaptation for particular measurement tasks, such special vessels only have a limited field of applications.

The objective of the invention is to provide an improved sample holder device for holding biological samples, with which disadvantages of conventional technologies should be avoided. The sample holder device should have in particular an expanded field of applications, e.g. in diagnostics, therapy and in biomedical processes and/or tests, have a simple structure, be suitable as single-use item, enable the use of an increased number of different methods for processing and/or investigating biological cells, be suitable for complex assays, and/or enable cryopreservation, e.g. after processing and/or investigating the sample, without changing the sample receptacle. The objective of the invention is also to provide improved methods for using such a sample holder device, with which disadvantages of conventional technologies are avoided. The methods should in particular enable the carrying out of various types of processing and/or investigating of samples without changing the sample receptacle.

These objectives are achieved in each case by a sample holder device and methods for its use in accordance with the invention.

BRIEF SUMMARY OF THE INVENTION

According to a first general aspect of the invention, the above objective is achieved by a sample holder device (or:

cultivation device, vessel arrangement, cultivation vessel, cultivation substrate) for holding at least one biological sample (in particular cells, cell components, cell aggregates, micro-organisms and/or tissue). The sample holder device comprises a base body having at least one sample receptacle. The at least one sample receptacle is configured to accommodate a biological sample, possibly with a liquid medium. The at least one sample receptacle is delimited in at least one spatial direction by at least one wall. The at least one wall has, on a surface facing the sample receptacle, a planar, carbon-based material which is liquid-impermeable. The base body is a vessel body, the walls of which preferably have a thickness smaller than the cross-sectional dimension of the at least one sample receptacle, and/or a compact cuboid, in particular a compact, plane or curved plate in which the at least one sample receptacle is formed.

According to the invention, the carbon-based material has such a high carbon content that the carbon-based material is opaque and electrically conductive. The carbon-based material advantageously fulfils, in addition to the simple delimitation of the respective sample receptacle, further functions which cannot be realized by conventional, transparent vessel wall materials originally developed from the requirements in the case of laboratory work and composed of glass or plastic. The inventors have found that the carbon in the wall of the sample receptacle provides electrical conductivity which is sufficiently high in particular for electrophysiological measurements and/or electrophysiological stimulations. The use of expensive metal electrodes and their installation in vessels are avoided. The carbon furthermore forms a shield for light, in particular scattered light from the surroundings of the sample holder device, e.g. light in the visible spectral range. This advantageously offers protection for light-sensitive samples (avoidance of what is known as bleaching) and the possibility of measuring, in a manner free from external light, even very small emissions, such as e.g. fluorescence or phosphorescence, of the sample and reducing background noise. The carbon is advantageously chemically inert so that undesirable reactions between samples and the wall of a sample receptacle are avoided. At the same time, the use of the carbon-based material enables the provision of the sample holder device with low costs. Further advantages of the carbon-based material result from its capacity for sterilization and biocompatibility. It can furthermore serve as a growth surface for relevant cell types of interest in practice and even enable the unchanged storage of biological material ready for use at cryogenic temperatures. The carbon-based material can be manufactured with a smooth (step-free) surface or a structured surface. The carbon-based material can furthermore be provided with a functional coating which influences the biological sample or its interaction with the surface, e.g. differentiation trigger or increase in adherence.

In contrast to EP 542 422 A1, the at least one wall of the sample receptacle is opaque. The absence of a direct visual check or optical mapping of the sample through a vessel wall does not, however, represent any critical disadvantage for numerous applications, in particular in the case of semi-automatic or automatic processing of samples. The visual check by operating personnel is not generally provided in the case of semi-automatic or automatic processing, and, where necessary, an examination of a sample can also be executed in an automated manner e.g. by incident light microscopy.

A further important advantage of the carbon-based material lies in the fact that it has a high degree of dimensional stability and thermal stability. The carbon-based material can be manufactured with high planarity. Deformations of the sample holder device as a result of mechanical forces or in the case of temperature changes are advantageously avoided. A positive-locking contact with a temperature control device is maintained even when passing through temperature control cycles with several changes in temperature. The sample holder device can be provided for multiple use or as a single-use item.

The sample holder device is preferably a integrative component, comprising the carbon-based material and possibly further components of the base body. The sample holder device particularly preferably does not contain a separate active temperature control device, e.g. heating plate.

According to a second general aspect of the invention, the above objective is achieved by a method for using the sample holder device according to the first general aspect of the invention, comprising processing of a biological sample (in particular cultivation and/or differentiation of cells), measurement of an interaction of the sample with light (in particular fluorescence measurement), electrophysiological measurement (in particular a derivation of electrical potentials and/or currents), transport and/or storage of biological samples (in particular in the frozen state), low-temperature treatment of biological samples (in particular at temperatures below −140° C.), and/or high throughput testing (in particular for diagnostic or regenerative medicine tasks).

As a result of the use according to the invention of the opaque and electrically conductive, carbon-based material, limitations of conventional vessels for processing biological samples are advantageously overcome. Particularly in the case of cryopreservation of biological samples, ice crystal-free freezing (vitrification) is facilitated since the carbon-based material enables precise manufacturing of shape-stable sample receptacles with small sample volumes and extremely rapid heat transfer during vitrification. Sample receptacles can be manufactured without loss of stability with small wall thicknesses from the carbon-based material, in particular with a thickness smaller than 0.2 mm so that a small thermal capacity is introduced by the wall of the sample receptacle and rapid heat transfer is ensured. A sample holder device according to the invention enables in particular cooling rates of at least 20,000° C./min in the sample receptacle.

According to an advantageous embodiment of the invention, the at least one wall can consist of the carbon-based material. The carbon-based material forms the wall in its entire superficial area and thickness extent. This embodiment has particular advantages in terms of the low-cost manufacturing of the sample holder device, in particular the at least one sample receptacle, and the stability in the case of temperature changes. The thickness of the at least one wall composed of the carbon-based material is preferably selected in the range from 150 μm to 1 mm. This thickness range has in particular advantages in terms of the low thermal capacity and the rapid heat transfer. Alternatively, a greater thickness, e.g. in the range up to 2 mm, 5 mm or above can be selected. The entire base body of the sample holder device advantageously can consist of the carbon-based material. In this case, advantages arise for the manufacturing costs of the sample holder device. The base body can in particular be manufactured in one piece from the carbon-based material (integral component composed of a uniform material).

According to a further modification of the invention, the at least one wall can have a multi-layer structure, wherein there is provided on the surface facing the sample receptacle a coating which is composed of the carbon-based material. An inner surface of the sample receptacle is formed by the carbon-based material. An outer ply can be composed e.g. from a plastic or glass. This embodiment of the invention has particular advantages in the case of applications in which the shielding of ambient light is primarily desired. A carbon-based coating can furthermore be advantageous for sample receptacles with a complex inner shape. The thickness of the coating made of the carbon-based material is preferably selected in the range from 2 nm to 500 μm. The opaqueness of the carbon-based material, in particular if it consists of pure carbon, can advantageously be achieved even in the case of small thicknesses in the nm range.

According to a further preferred embodiment of the invention, the carbon-based material can have a surface structure on its surface facing the sample receptacle. The surface structure comprises elevations and/or recesses in relation to the superficial area of the surface. The shape and size of the elevations and/or recesses are selected so that a mechanical interaction of biological samples with the carbon-based material is promoted. The surface structure comprises in particular edges and tips, which form coupling points for the adherent coupling of biological cells. It can furthermore also be advantageous for a subsequent release of the adherent coupling if the biological sample, in particular the biological cells, form point contacts with the surface as a result of the surface structure.

The surface structure particularly preferably comprises a predetermined roughness of the carbon-based material and/or a surface with a plurality of projections of the carbon-based material. The roughness can advantageously be selected as a function of the concrete application, in particular the type of cells to be held in the sample holder device. The roughness of the carbon-based material preferably forms a submicro- or nanostructure with typical dimensions smaller than 100 nm. Cells react differently to roughnesses as a result of adherent coupling and/or cell reactions. The number of adsorbent protein molecules can be adjusted by adjusting the roughness. Differentiating steps can also be triggered by a rough surface. Projections can be formed e.g. with a shape of columns or pyramids, wherein preferred thickness dimensions are selected in the range from 250 nm to 500 μm. The projections of the carbon-based material are particularly preferably dimensioned and arranged so that several projections are provided in the region of a contact surface of a biological cell, preferably in the lateral direction over a length of around 20 μm.

At least one inner surface of the sample receptacle, in particular a smooth, unstructured surface or a surface with the surface structure, can furthermore additionally be provided with a functional coating. The functional coating can comprise e.g. adsorbent proteins which form anchor points for the adherent coupling of biological cells.

The volume ratio of the carbon in the carbon-based material is generally at least 5%, in particular at least 25%. The carbon-based material is preferably black. A further advantage of the invention lies in the fact that several carbon-based materials are available which are electrically conductive and opaque. According to a first variant, the carbon-based material can comprise pure carbon, e.g. pyrolytic carbon. Alternatively, the carbon-based material can comprise a plastic reinforced with carbon fibers (carbon fiber-reinforced plastic, CFP). A carbon to which silicon is added, in particular silicon carbide, with heat conductivities of greater than 120 W/(m·K), in particular greater than 250 W/(m·K), can furthermore be used as a further alternative. It is furthermore generally possible to form the surface facing the inside of the sample receptacle from a carbon-based material which comprises several components, such as e.g. at least one ply of pure carbon and at least one ply of carbon fiber-reinforced plastic or a compound of different carbon forms. The carbon in the carbon-based material can have an amorphous, crystalline or polycrystalline structure, wherein, however, a diamond material (material with carbon with diamond structure) is excluded.

The above examples of carbon-based materials advantageously have a high degree of electron and heat conductivity (in particular adapted to the electron and heat conductivity of copper), high oxidation stability (the materials are chemically inert in particular for biological samples), biocompatibility and tissue compatibility, good mechanical properties (e.g. high strength (in particular breaking strength) and high planarity), high resistance to temperature change, a low coefficient of expansion and a high chemical resistance.

The sample holder device can, according to a further aspect of the invention, be manufactured with one of the following methods. The method is selected as a function of the material concretely used. According to a first variant, the sample holder device can be manufactured by a mechanical removal method, e.g. milling, sawing and/or boring, from a solid material which contains carbon, e.g. pyrolytic carbon or carbon fiber-reinforced plastic. According to a further variant, the carbon-based material can initially be manufactured by a composite formation from a binding agent, such as e.g. polystyrene or polypropylene, and carbon fibers. The shaping can then be executed by application of a coating made of the composite on the inner sides of the sample receptacles and/or by injection molding.

According to a further advantageous embodiment of the invention, the sample holder device can be provided with at least one contact section which is configured for electrical connection of the at least one wall to a voltage source and/or a measuring device. The contact section can comprise e.g. an electrically conductive coating, such as a metal layer, on the base body and/or a connecting line, such as a connecting wire. If the sample holder device comprises several sample receptacles, these are arranged preferably electrically isolated relative to one another and provided in each case with a contact section. Several electrophysiological tests and/or stimulations are thus advantageously enabled in the sample receptacles in parallel, independently of one another.

The at least one sample receptacle is generally formed so that the biological sample, possibly with a liquid medium, is localized on the at least one wall. Holding on the at least one wall is executed under the action of the force of gravity (e.g. when depositing drops on a substrate), of intermolecular forces (e.g. in the retention of hanging drops) and/or of constraining forces which are exerted by several walls on a sample enclosed in the sample receptacle.

According to a further preferred embodiment, if the base body of the invention comprises several walls which enclose an internal volume of the sample receptacle, the carbon-based material of the walls is formed in one piece. The internal volume of the sample receptacle can be delimited on one side or several sides by the at least one wall. The sample receptacle can be closed on all sides with at least one closable access opening or be open on one or multiple sides. The walls delimit the sample receptacle, for example, in the direction of gravity and on all sides in the horizontal direction (sample receptacle open at the top) or in all spatial directions (sample receptacle closed on all sides).

A plurality of forms of the sample holder device with one or more sample receptacles are advantageously available. The sample holder device can comprise e.g. a dish, optionally with a cover, in particular a petri dish, a substrate, a multiwell plate (in particular micro- or nanotiter plate), a sample beaker, in particular in the form of a beaker glass, a sample tube, in particular in the form of a test tube or so called tubes or a tube for cryopreservation (cryovial), and/or a hollow fiber. Hollow fibers which are manufactured according to the invention from the carbon-based material have advantageous applications in a hollow fiber bioreactor (cultivation device with a container in which hollow fibers are arranged, on the outer surfaces of which cells adhere and through which a cultivation medium flows). A combination of the stated forms and/or an arrangement with a plurality of sample holder devices can also be provided. Carbon-based sample holder devices, in particular cell culture disposables, are advantageously provided which are equal to conventional vessels in terms of size and shape and therefore can be readily integrated into existing processes. In particular in the case of the multiwell plate, this can be manufactured completely or exclusively on the inner side of the wells (single vessels, bowls) from the carbon-based material.

BRIEF DESCRIPTION OF THE DRAWINGS

Further details and advantages of the invention are described below with reference to the enclosed drawings, which show schematically.

DETAILED DESCRIPTION OF PREFERRED EMBODIMENTS OF THE INVENTION

Embodiments of the invention are described below with exemplary reference to embodiments of the sample holder device according to the invention in the form of a petri dish, a cryotube and a multiwell plate. It is emphasized that the implementation of the invention is not restricted to these variants, but rather can be correspondingly used with other vessel forms, such as e.g. a beaker, a flask, a hollow tube reactor or the like, or a sample holder device in the form of a flat substrate. Moreover, modifications of the dimensions and/or forms of the sample holder device and/or the individual sample receptacles, in particular for an adjustment to a special application, are possible. Details of the processing and/or investigating of biological samples are not described here since they are known per se from conventional technology.

Figure 1:
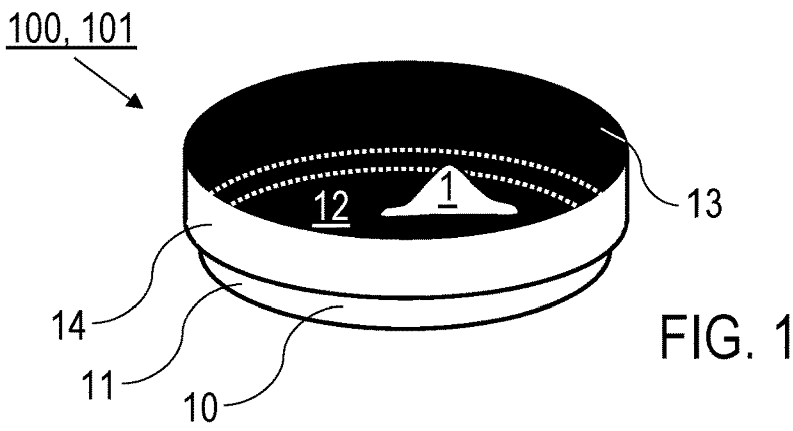
FIG. 1: a perspective view of an embodiment of the sample holder device according to the invention in the form of a petri dish.

FIG. 1 shows an embodiment of sample holder device 100 according to the invention in the form of a petri dish 101. The shape and size of petri dish 101 can be selected as is known from conventional petri dishes. It can have in particular a height of 1 cm and a diameter of 3 to 12 cm. The petri dish 101 comprises a base body 10 in the form of a dish part which forms the sample receptacle 12 for the biological sample 1. Sample receptacle 12 is delimited by walls 11 which comprise the dish base and the laterally circumferential dish wall, e.g. made of glass or plastic. A coating 13 composed of carbon fiber-reinforced plastic is provided on the inner side of the walls 11. A solid, artificial cultivation ground for the culture of e.g. cells or cell tissue can be arranged on the dish base.

The petri dish 101 is furthermore preferably provided with a closing cover part 14. Cover part 14 is shown to be transparent in order to illustrate the inside of petri dish 101, but is composed like the dish part of plastic or glass with an inner coating composed made of carbon fiber-reinforced plastic. Cover part 14 can particularly preferably be coupled in a liquid-impervious manner to the base body 10 (dish part).

Figure 2:
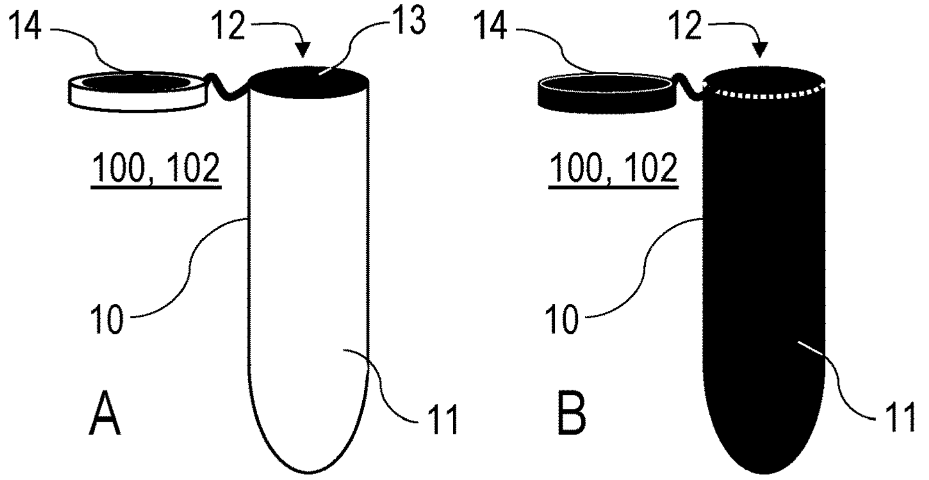
FIGS. 2A and 2B: side views of an embodiment of the sample holder device according to the invention in the form of a cryotube.

FIG. 2 shows two variants of an embodiment of the sample holder device 100 according to the invention in the form of a cryotube 102. According to FIG. 2A, cryotube 102 comprises externally plastic or glass and internally a coating 13 made of the carbon-based material, e.g. carbon fiber-reinforced plastic, while according to FIG. 2B the entire cryotube 102 is manufactured from the carbon-based material. In detail, cryotube 102 comprises a base body 10 in the form of a sample tube closed on one side, having a cylindrical wall 11 closed at the lower end (base). The inside of the sample tube forms sample receptacle 12. A cover part 14 which closes in a liquid-impervious manner is fastened to the upper end of the sample tube. The cryotube 102 has e.g. an inner diameter of 11 mm and an axial length of 4.1 cm.

Figure 3:
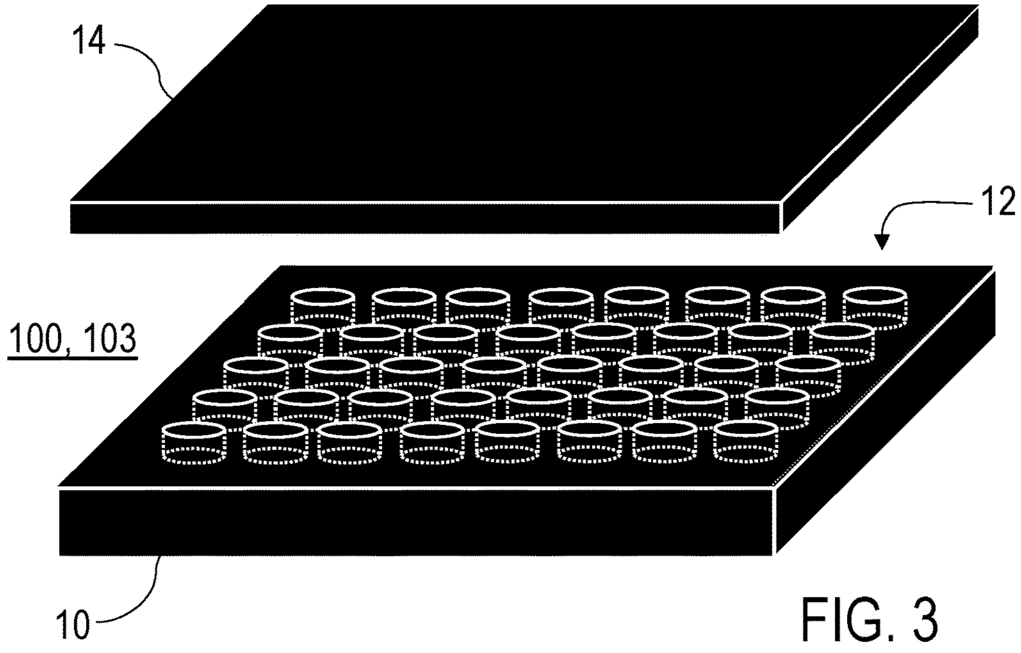
FIGS. 3 and 4: perspective views of an embodiment of the sample holder device according to the invention in the form of a multiwell plate.
Figure 4:
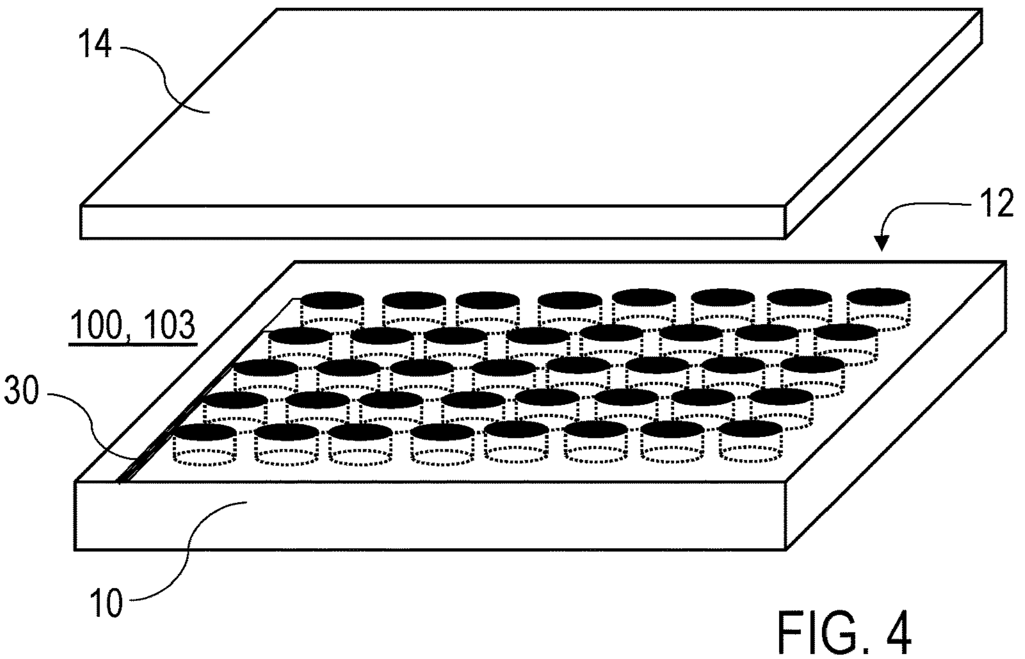

Further embodiments of the sample holder device 100 according to the invention in the form of a multiwell plate 103 are shown schematically in FIGS. 3 and 4. An arrangement of sample receptacles 12 (wells) is provided in a base body 10 which forms a base plate of multiwell plate 103. The number and size of the sample receptacles 12 is selected as is known per se from conventional micro- or nanotiter plates. The multiwell plate 103 furthermore has a cover part 14 with which the sample receptacles 12 are covered and optionally sealed off in a liquid-impervious manner. According to FIG. 3, the entire multiwell plate 103 is manufactured from the carbon-based material, e.g. from pyrolytic carbon or silicon carbide. According to FIG. 4, only the sample receptacles 12 of the multiwell plate 103 and the side of the cover part facing the sample receptacles 12 are provided with the carbon-based material, e.g. a layer of carbon fiber-reinforced plastic, while the remaining base plate and the remaining cover part are manufactured from plastic or glass. In order to isolate the sample receptacles 12 electrically from one another even when using the multiwell plate 103 with closed cover part 14, the cover part 14 can be provided with a structured coating restricted to the openings of sample receptacles 12 and made of the carbon-based material.

FIG. 4 furthermore illustrates contact sections 30 which comprise metallic conductor strips on the surface of the holding body 10. The conductor strips are electrically connected separately from one another in each case to one of the sample receptacles 12. Although FIG. 4 only shows for the first row of sample receptacles 12 on the grounds of clarity, each sample receptacle 12 preferably can be provided with an associated contact section 30 for connection to a voltage source and/or a measuring device 40 (see FIG. 5). Specific electrical measurements and/or stimulations in individual sample receptacles 12 are thus advantageously enabled.

Alternatively, the sample receptacles 12 of multiwell plate 103 can be coupled to the voltage source and/or measuring device in groups or all jointly via several or a single contact section 30.

Figure 5:
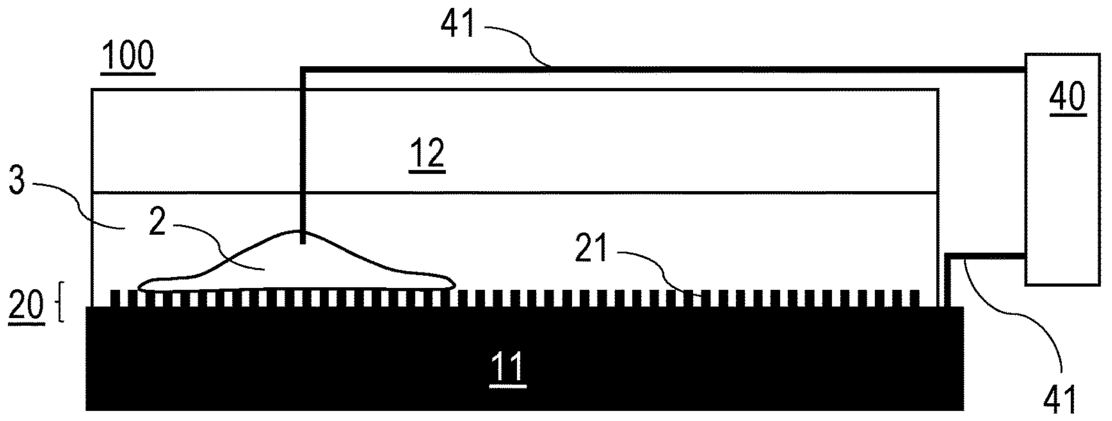
FIG. 5: an illustration of an electrophysiological measurement using an embodiment of the sample holder device according to the invention.

Further features of preferred embodiments of the invention which can be realized individually or in combination in the case of the various variants of sample holder device 100 are shown in the schematic sectional view of sample holder device 100 according to FIG. 5. A biological sample with at least one biological cell 2 in a liquid medium 3, e.g. cultivation medium and/or medium with differentiation factors, is located in the sample receptacle 12, of which only the lower wall 11 (base section) is shown.

The carbon-based material of wall 11 has, on its inner surface facing the sample receptacle 12, a surface structure 20 with column-shaped projections 21 of the carbon-based material. The projections 21 have, for example, a height of 2 μm, a cross-sectional dimension, e.g. diameter, of 5 μm, and a mutual center-center spacing of 20 μm. In FIG. 5, all projections 21 are dimensioned with an identical height such that the free ends of projections 21 span a planar carrier surface for adherent holding of the biological sample, such as e.g. the adherent cell 2. Alternatively, the projections 21 can have different heights, as a result of which an adherence of cells to the surface can be increased. The biological cell 2 touches the projections 21 in the lateral direction along the surface over a contact area with a typical extent of e.g. 40 μm and is as a result supported by several projections 21.

The free ends of projections 21 or their tips or edges form geometrical surface features (coupling points), on which the adherent coupling of biological cells is promoted. The adherence can be further increased in that projections 21 are provided with a functional coating in order to increase adherence, e.g. made of fibronectin, laminin or synthetic RGD peptide sequences.

FIG. 5 furthermore schematically shows a measuring device 40 for electrical measurements which are connected via connecting lines 41 on one hand to the carbon based material of wall 11 and on the other hand to the interior of sample receptacle 12, e.g. directly to biological cell 2 or to liquid medium 3. Contact with the carbon-based material can be realized via a contact section (not represented, see FIG. 4). The measuring device 40 comprises e.g. a voltage measuring device for the derivation of membrane potentials or membrane potentials currents from cell 2. Deviating from FIG. 5, other arrangements of one or more measuring devices and one or more connecting lines can be provided.

Figure 6:
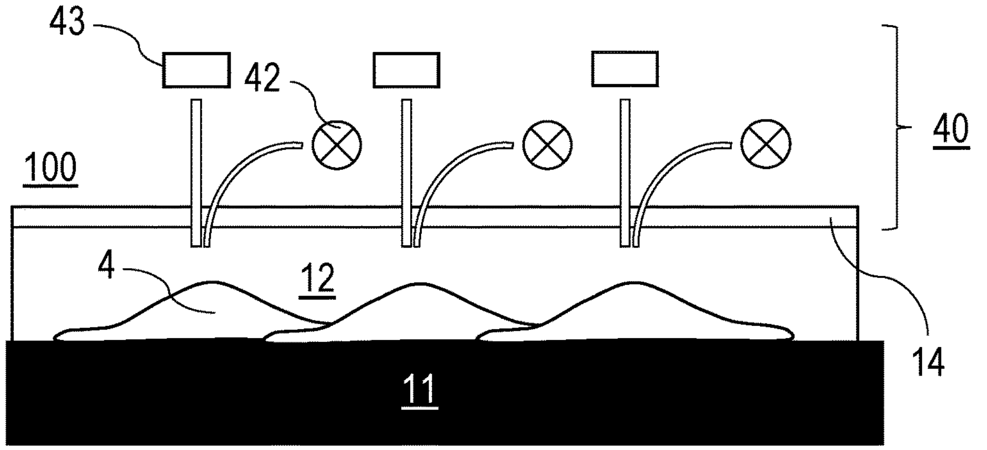
FIG. 6: an illustration of an optical measurement using an embodiment of the sample holder device according to the invention.

FIG. 6 schematically illustrates a measuring device 40 for optical measurement on a biological sample in the form of a cell culture 4 in sample receptacle 12 according to a further embodiment of a sample holder device 100 according to the invention. The measuring device 40 comprises one or more excitation light sources 42, such as e.g. laser diodes, and one or more sensor devices 43, such as e.g. photodiodes, spectrally resolving detectors and/or sensor cameras. The excitation light sources 42 and the sensor devices 43 are optically coupled via optical fibers to the interior of sample receptacles 12. Disruptive external light is excluded in the interior of sample receptacles 12 as a result of the formation of wall 11 and cover 14 with the opaque carbon-based material. The excitation light sources 42 and the sensor devices 43 are furthermore connected to a control device (not shown) which is configured to control the excitation light sources 42 and to record and evaluate sensor signals. For example, fluorescence measurements in the sample receptacle can be executed with the measuring device 40 for optical measurement.

Figure 7:
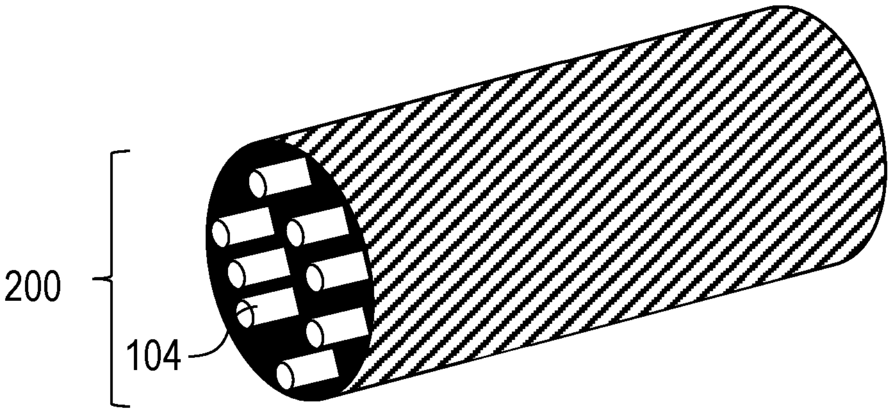
FIG. 7: an embodiment of the invention, in the case of which a plurality of sample holder devices in the form of hollow fibers are arranged in a bioreactor.

According to the schematic partial view in FIG. 7, a further embodiment of the invention comprises a plurality of hollow fibers 104 which are arranged in a bioreactor 200. The hollow fibers 104 are manufactured at least on their surfaces e.g. from plastic reinforced with carbon fibers and/or coated with carbon, and they have an inner diameter in the range from e.g. 0.1 mm to 5 mm. The bioreactor 200 comprises in a manner known per se a container, e.g. in the form of a hollow cylinder, with a container wall closed on all sides (shown open here). The container wall is provided with fluidic and sensor connections and optionally with windows and/or further access openings. The hollow fibers 104 extend in axial direction of the bioreactor 200. For example, 10000 hollow fibers 104 are arranged in the bioreactor, and it is filled with a cultivation medium which washes around hollow fibers 104. It is preferably provided that the cultivation medium flows through bioreactor 200.

Applications of the sample holder device according to the invention were tested during the vitrification of biological samples. With the vitrification e.g. of *Drosophila melanogaster* embryos (DM embryos), human stem cells (embryonal, adult, induced), differentiated cells, in particular those which can be tested electrophysiologically (cardiomyocytes, neuronal cells), proteins, sperm cells and tissue (e.g. biopsy samples), in particular an SiC substrate has been shown to be advantageous due to the rapid exchange of heat with a cooling device coupled to the sample holder device.

Further applications of the sample holder device according to the invention in the case of electrophysiological measurements were likewise successful. Electrophysiological measurements are often preceded by protracted cultivation and differentiation protocols lasting from weeks to months until the cells have the required degree of maturity which is characterized by the formation of particular channels or contacts. The sample holder device offers various possibilities for deriving electrophysiological signals over a larger surface area than is possible in the case of the current prior art. For example, in the case of derivations according to the patch-clamp method, electrophysiological signals are typically measured with only one cell. The technology according to the invention enables parallel measurement at several cells. Moreover, cells which grow adherently in the sample holder device can be manipulated via electrical signals, and as a result differentiating steps can be influenced. As a result of the opaqueness of the sample holder device, fluorescence-based measurements of the calcium efflux can be recorded without background noise. In particular for the patch-clamp method, cells are initially cultivated and then measured in the same cultivation vessel, such as e.g. a petri dish with 35 mm diameter. In particular walls of the sample receptacles made of pyrolytic carbon have been shown to be advantageous for electrophysiological measurements.

The features of the invention disclosed in the above description, the drawings and the claims can be of importance both individually and in combination or sub-combination in order to carry out the invention in its various configurations.

The invention claimed is:

1. A sample holder device which is configured to hold biological samples, comprising a base body having at least one wall which is arranged to delimit a sample receptacle, wherein the at least one wall comprises, at least on a surface facing the sample receptacle, a planar, carbon-based material which consists of pure carbon and is impermeable to a liquid in the sample receptacle, wherein the carbon-based material has such a high carbon content that the carbon-based material is opaque and electrically conductive, the carbon-based material has, on the surface facing the sample receptacle, a surface structure which promotes a mechanical interaction of biological samples with the carbon-based material, said surface structure comprising projections forming edges and tips, which form coupling points for an adherent coupling of biological cells, said surface structure comprises a roughness of said carbon-based material, said roughness forming a sub-micro-structure or nanostructure with typical dimensions smaller than 100 nm, said projections are dimensioned and arranged so that several projections are provided in a region of a contact surface of a biological cell in a lateral direction of said surface over a length of around 20 μm, the at least one wall has, on the surface facing the sample receptacle, an inner coating which consists of the carbon-based material consisting of pure carbon, and a functional coating is on the inner coating, and is effective to influence an interaction of the biological samples with the surface by increasing an adherence of the biological cells, said functional coating comprising an adsorbent protein which forms anchor points for the adherent coupling of the biological cells, wherein the sample holder device comprises a hollow fiber.

2. The sample holder device according to claim 1, wherein the at least one wall consists of the carbon-based material.

3. The sample holder device according to claim 2, wherein the at least one wall consisting of the carbon-based material has a thickness in a range from 150 μm to 1 mm.

4. The sample holder device according to claim 2, wherein the entire base body other than the functional coating consists of the carbon-based material.

5. The sample holder device according to claim 1, wherein the coating consisting of the carbon-based material has a thickness in a range from 2 nm to 500 μm.

6. The sample holder device according to claim 1, further comprising at least one contact section which is arranged for a connection of the at least one wall to at least one of a voltage source and a measuring device.

7. The sample holder device according to claim 1, wherein the base body comprises several walls which enclose a volume of the sample receptacle, wherein the carbon-based material of the walls is formed in one piece.

8. The sample holder device according to claim 1, comprising at least one of a dish,
a flat substrate,
a multiwell plate,
a sample beaker, and
a sample tube.

9. A method of using the sample holder device according to claim 1, said method comprising carrying out at least one of the following steps:

processing of cell or tissue samples,
cultivation of cell cultures,
differentiation of cell cultures,
optical measurement
fluorescence measurement,
electrophysiological measurement,
derivation of electric potentials or currents,
transport of biological samples
transport of biological samples in a frozen state,
storage of biological samples
storage of biological samples in a frozen state
cryogenic treatment of biological samples,
high-throughput testing, and
high-throughput testing for diagnostic or regenerative medicine tasks.

10. The sample holder device according to claim 1, wherein the hollow fiber is configured for adherent holding of biological cells, and the sample holder device further comprises at least one of:

a petri dish,
a beaker glass, and
a test tube or a tube for cryopreservation.

* * * * *